US011930139B2

(12) United States Patent
Shimizu et al.

(10) Patent No.: US 11,930,139 B2
(45) Date of Patent: Mar. 12, 2024

(54) CONTROL DEVICE INCLUDING PROCESSOR THAT SIMULTANEOUSLY DISPLAYS A SELECTION LIST OF TASKS AND SLIDE BUTTON, INFORMATION PROCESSING APPARATUS, AND RECORDING MEDIUM STORING CONTROL PROGRAM FOR INFORMATION PROCESSING APPARATUS

(71) Applicant: FUJIFILM CORPORATION, Tokyo (JP)

(72) Inventors: Yuki Shimizu, Kanagawa (JP); Yu Mishima, Kanagawa (JP); Yoshihiro Sekine, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/846,041

(22) Filed: Jun. 22, 2022

(65) Prior Publication Data
US 2022/0321714 A1  Oct. 6, 2022

Related U.S. Application Data

(63) Continuation of application No. PCT/JP2020/049160, filed on Dec. 28, 2020.

(30) Foreign Application Priority Data

Dec. 27, 2019  (JP) ................................ 2019-239027

(51) Int. Cl.
  *H04N 1/00* (2006.01)
  *G06F 3/0482* (2013.01)
  *G06F 3/0488* (2022.01)

(52) U.S. Cl.
  CPC ....... *H04N 1/00413* (2013.01); *G06F 3/0482* (2013.01); *G06F 3/0488* (2013.01);
  (Continued)

(58) Field of Classification Search
  None
  See application file for complete search history.

(56) References Cited

U.S. PATENT DOCUMENTS

2006/0188284 A1* 8/2006 Ikeda ................. G03G 15/6502
  399/82
2010/0295805 A1* 11/2010 Shin ...................... G06F 3/0488
  345/173

(Continued)

FOREIGN PATENT DOCUMENTS

JP  2012-527685 A  11/2012
JP  2015-1948 A   1/2015

(Continued)

OTHER PUBLICATIONS

Extended European Search Report dated May 10, 2023, issued in corresponding EP Patent Application No. 20906480.7.

*Primary Examiner* — Miya J Cato
(74) *Attorney, Agent, or Firm* — SOLARIS Intellectual Property Group, PLLC

(57) ABSTRACT

A control device includes a processor and a memory coupled to or integrated with the processor and controls an information processing apparatus, in which the processor is configured to simultaneously display, in an operation screen, a selection list of tasks for selecting a task to be executed by the information processing apparatus and a slide button as an execution button for instructing execution of the selected task, and once an operation of instructing execution of the (Continued)

task by the slide button is detected, performs control to change the slide button to a cancel button for canceling the task that is being executed.

7 Claims, 9 Drawing Sheets

(52) U.S. Cl.
CPC ..... *H04N 1/00411* (2013.01); *H04N 1/00474* (2013.01); *H04N 1/00482* (2013.01); *H04N 2201/0094* (2013.01)

(56) References Cited

U.S. PATENT DOCUMENTS

| | | | |
|---|---|---|---|
| 2012/0099131 A1* | 4/2012 | Tani | G03G 15/5087 |
| | | | 358/1.13 |
| 2013/0227454 A1 | 8/2013 | Thorsander et al. | |
| 2015/0074594 A1 | 3/2015 | Shin et al. | |
| 2015/0189102 A1* | 7/2015 | Kusakabe | H04N 1/33307 |
| | | | 358/1.15 |
| 2017/0208196 A1* | 7/2017 | Fujii | H04N 1/00474 |
| 2022/0321715 A1* | 10/2022 | Mishima | H04N 1/00411 |

FOREIGN PATENT DOCUMENTS

| | | |
|---|---|---|
| JP | 2018-32407 A | 3/2018 |
| JP | 2018-55697 A | 4/2018 |
| JP | 2018-198018 A | 12/2018 |

\* cited by examiner

CONTROL DEVICE INCLUDING PROCESSOR THAT SIMULTANEOUSLY DISPLAYS A SELECTION LIST OF TASKS AND SLIDE BUTTON, INFORMATION PROCESSING APPARATUS, AND RECORDING MEDIUM STORING CONTROL PROGRAM FOR INFORMATION PROCESSING APPARATUS

CROSS-REFERENCE TO RELATED APPLICATIONS

This application is a continuation application of International Application No. PCT/JP2020/049160, filed on Dec. 28, 2020, the disclosure of which is incorporated herein by reference in its entirety. Further, this application claims priority from Japanese Patent Application No. 2019-239027, filed on Dec. 27, 2019, the disclosure of which is incorporated herein by reference in its entirety.

FIELD

The technology of the present disclosure relates to a control device, an information processing apparatus, and a recording medium storing a control program for the information processing apparatus.

In a multi-function peripheral or other information processing apparatuses, for example, a tap button for starting a job by being touched by a finger of an operator may be used as a start button on a touch panel. In this case, in a case where there is a component (a list, a button, or the like) of a user interface that is operated by another touch operation around the tap button, there is a problem that the tap button is erroneously touched and a job is started at an unintended timing.

For example, although not related to a multi-function peripheral, there is a user interface in which a specific task can be selected from a task list displayed on a screen, and a sliding operation can be performed on the list in a left-right direction with a finger, thereby executing a desired task.

There is also a user interface in which a task cancel button is displayed on a screen for selecting and executing a task.

For example, Japanese Patent Application Laid-Open (JP-A) No. 2012-527685 discloses a mobile terminal that outputs a region in which a plurality of scrollable items are disposed and designates a specific item according to occurrence of a first touch event. The mobile terminal determines whether or not a second touch event has occurred for a specific item specified within a certain range where scrolling does not occur, and changes and displays at least one of a color or a shape of an image corresponding to the specific item designated according to the occurrence of the second touch event.

Japanese Patent Application Laid-Open (JP-A) No. 2015-1948 discloses a program execution device including a display unit, an operation unit that is superimposed on the display unit, a coordinate detection unit that detects a movement trajectory of an indicator indicating one point of the display unit, and a list screen generation unit that generates a list screen of images on the display unit. The list screen generation unit is a program execution unit and executes a program when the coordinate detection unit detects that the indicator has moved a predetermined distance in a specific direction perpendicular to a scroll direction.

Japanese Patent Application Laid-Open (JP-A) No. 2018-198018 discloses a terminal device including slide display means that performs, in a case where an operation signal for executing a swipe operation in a first state in which a first object is displayed on a display unit is received, display of moving the first object toward a first end of the display unit at a first speed to move the first object out of a screen of the display unit and performs display of moving a second object from the first end toward the inside of the screen of the display unit at a second speed higher than the first speed after a predetermined time elapses from when the movement of the first object starts. The terminal device is provided with a canceling unit that, in a case where an operation signal for canceling slide display with respect to the first object or a background area has been received in a second state in which the first object or the second object is moving, returns the display of the display unit from the second state to the first state.

SUMMARY

In all the technology described in JP-A No. 2012-527685, the technology described in JP-A No. 2015-1948, and the technology described in JP-A No. 2018-198018, an execution button and a cancel button for a task are separate buttons. Therefore, when trying to cancel a task immediately after operating the execution button, there is a possibility that a finger cannot immediately move to the cancel button, as a result of which the task is executed.

An object of the technology of the disclosure is to obtain a control device, an information processing apparatus, and a recording medium storing a control program for the information processing apparatus, in which a cancel button can be operated immediately after operating an execution button without moving a finger between the execution button and the cancel button for a task.

A control device according to a first aspect is a control device that includes a processor and a memory coupled to or integrated with the processor and controls an information processing apparatus, in which the processor is configured to simultaneously display, in an operation screen, a selection list of tasks for selecting a task to be executed by the information processing apparatus and a slide button as an execution button for instructing execution of the selected task, and once an operation of instructing execution of the task by the slide button is detected, performs control to change the slide button to a cancel button for canceling the task that is being executed.

In the control device, the slide button may be controlled so as to be displayed after the task is selected by an operation of the selection list.

In the control device, the slide button may be controlled so as to be displayed in a same row as that in which the selected task is displayed.

In the control device, in a case in which a preset specific task is selected from the tasks, a tap button may be displayed instead of the slide button.

An information processing apparatus according to a second aspect includes: the control device; and a printing unit that prints data on a recording medium, in a case in which a task for which a printing function is to be executed is selected, the processor performs control such that a number of copies to be printed is displayed in the slide button after the task is selected in an execution screen for the printing function.

In the information processing apparatus, the processor may perform control such that the number of copies to be printed is changeable by operating the slide button in which the number of copies to be printed is displayed.

An information processing apparatus according to a third aspect includes: the control device; and a communication unit that communicates data, in a case in which a task for which a facsimile function is to be executed is selected, the processor performs control such that a number of copies to be transmitted is displayed in the slide button after the task is selected in an execution screen for the facsimile function, and a transmission destination list is displayed in the execution screen.

A control program according to a fourth aspect is a control program for causing a computer to function as a control device that controls an information processing apparatus that executes a plurality of functions, in which a selection list of tasks for selecting a task to be executed by the information processing apparatus and a slide button as an execution button for instructing execution of the selected task are simultaneously displayable in an operation screen, and once an operation of instructing execution of the task by the slide button is detected, control is performed to change the slide button to a cancel button for canceling the task that is being executed.

According to the technology of the disclosure, the cancel button can be operated immediately after operating the execution button without moving a finger between the execution button and the cancel button for a task.

DESCRIPTION OF EMBODIMENTS

Hereinafter, embodiments of the present disclosure will be described with reference to the drawings.

First Embodiment (Multi-Function Peripheral 100)

Figure 1:
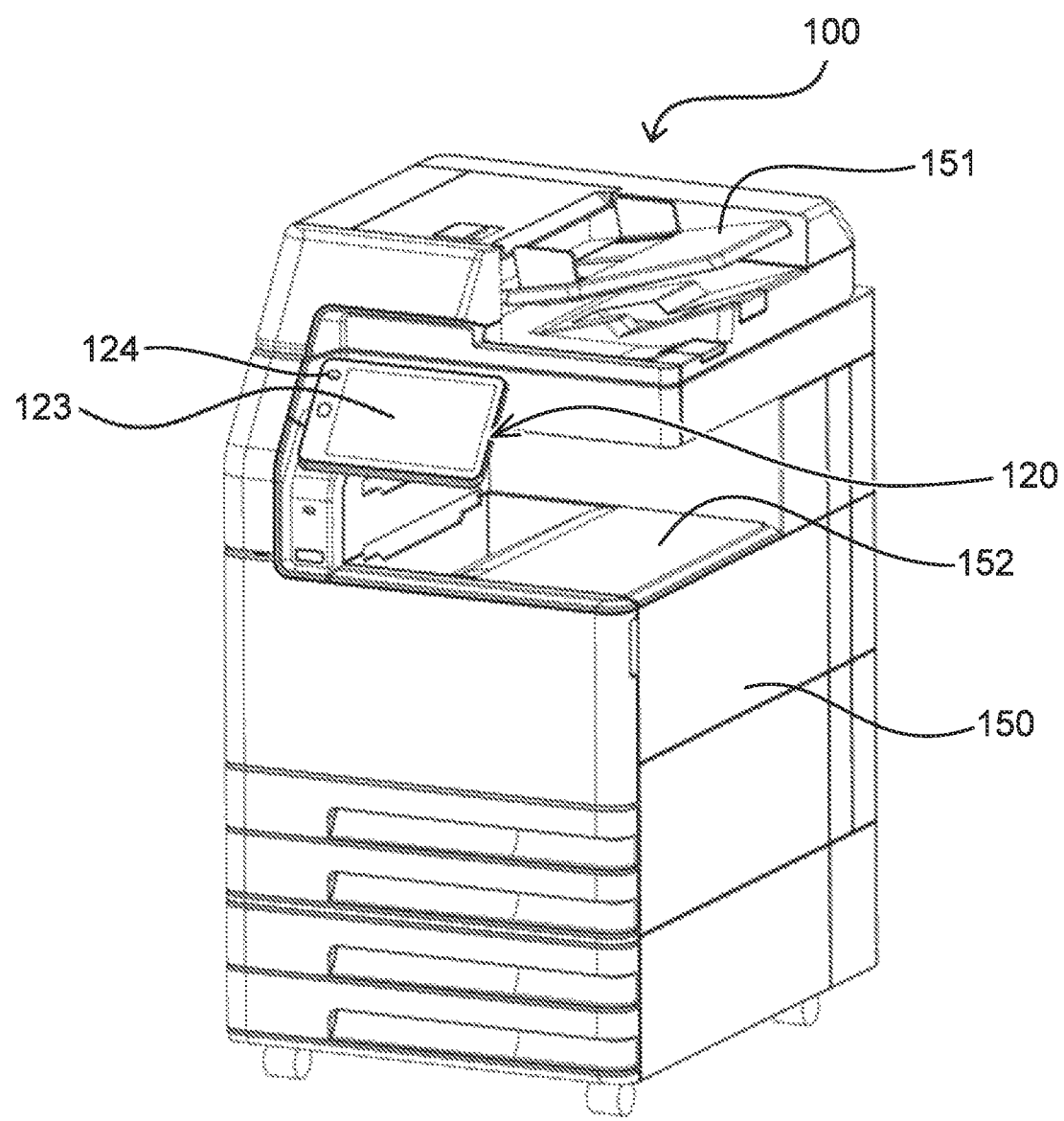
FIG. 1 is a view illustrating an appearance of a multi-function peripheral according to a first embodiment.
Figure 2:
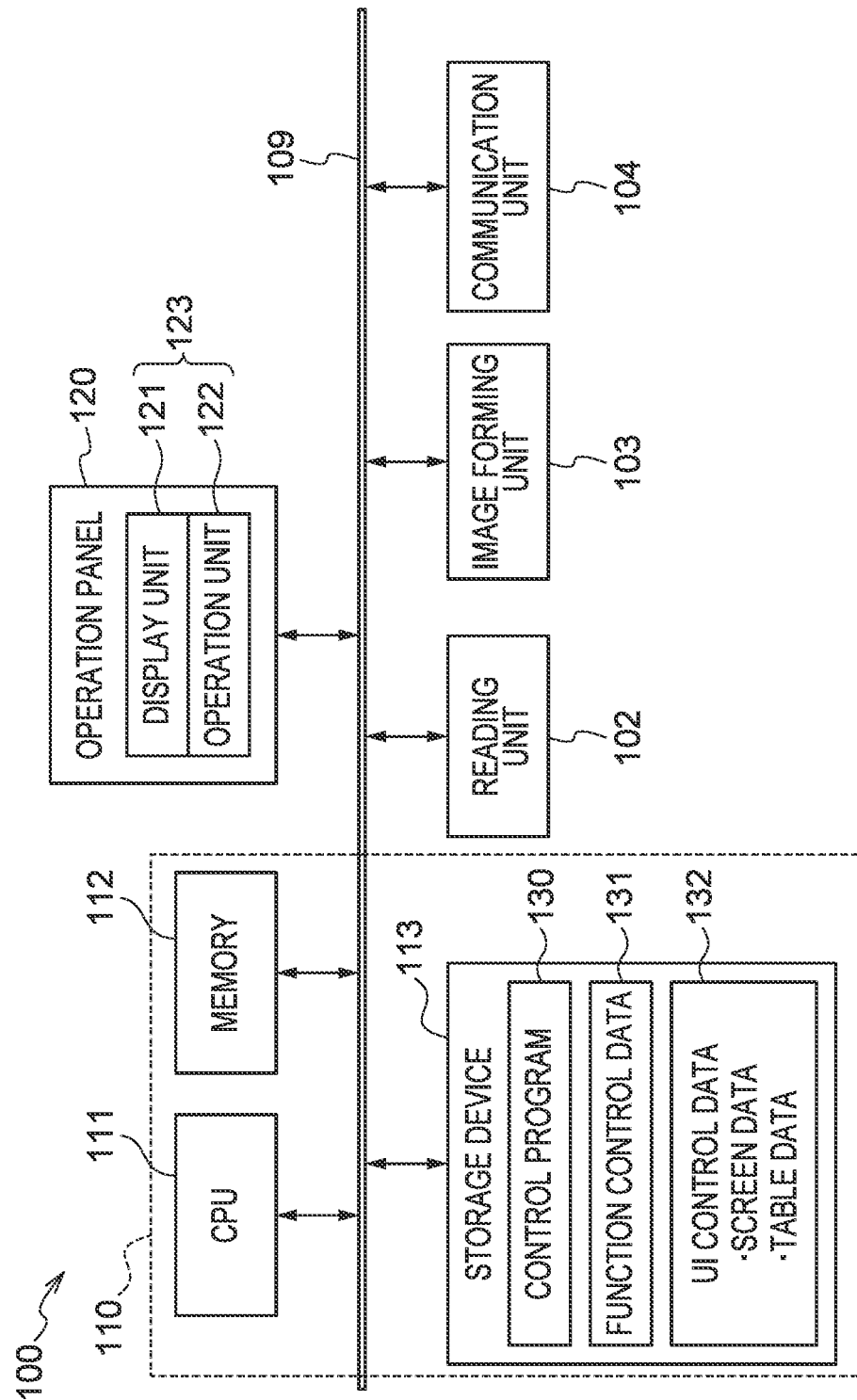
FIG. 2 is a block diagram illustrating a hardware configuration of a display control device used in the multi-function peripheral according to the first embodiment.

An information processing apparatus of the disclosure will be described with a multi-function peripheral 100 as an example. FIG. 1 is a view illustrating an appearance of a multi-function peripheral 100 according to a first embodiment. FIG. 2 is a block diagram illustrating a hardware configuration of the multi-function peripheral 100.

The multi-function peripheral 100 illustrated in FIGS. 1 and 2 is a device capable of executing processing for functions such as copying, printing (an example of printing), image scanning, and facsimile (also referred to as FAX). As illustrated in FIG. 2, the multi-function peripheral 100 includes a control device 110, a reading unit 102, an image forming unit 103, and a communication unit 104 in a main body 150. Note that the multi-function peripheral 100 is an example of the information processing apparatus. The image forming unit 103 is an example of a printing unit. The multi-function peripheral 100 can perform data communication with an information processing apparatus such as a personal computer or a server in an office connected to a local area network (LAN) line or the like, or perform facsimile communication with a communication apparatus in another office through a public line such as a telephone line. Therefore, the multi-function peripheral 100 is also an example of the information communication apparatus. That is, the information communication apparatus has a function of transmitting a voice or an image by communication. The information processing apparatus of the disclosure includes, in addition to a telephone line apparatus such as a mobile phone and a facsimile, for example, an information processing apparatus in which functions of office equipment such as a copier, a printer, an image scanner, and a facsimile are housed in one housing, like the multi-function peripheral 100.

An operation panel 120, the control device 110 including a storage device 113, the reading unit 102, the image forming unit 103, and the communication unit 104 are mutually connected by a bus 109. Each unit of the multi-function peripheral 100 will be described below.

(Reading Unit 102, Image Forming Unit 103, and Communication Unit 104)

The reading unit 102 reads an image of a document. Specifically, the reading unit 102 generates image data by optically reading an image of a document and converting the image into a digital signal.

The image forming unit 103 forms an image on a medium such as a paper sheet. Specifically, the image forming unit 103 forms an image on a medium by, for example, an electrophotographic method in which an image is formed by electrostatically attaching a toner onto a paper sheet. Note that the image forming unit 103 may form an image on a medium by another method such as an inkjet method in which an image is formed by ejecting an ink onto a paper sheet.

The communication unit 104 communicates with an external device such as another facsimile device. Specifically, the communication unit 104 transmits and receives various pieces of data to and from an external device by communication using various wired or wireless communication lines. Examples of the communication line include the Internet, an intranet, and a public telephone line.

For example, the multi-function peripheral 100 includes a document feeding device 151 provided at an upper portion of the main body 150 as illustrated in FIG. 1. The document feeding device 151 feeds a document to a document reading stage (not illustrated) disposed on an upper surface of the main body 150. The reading unit 102 is disposed at a position facing the reading stage in the main body 150. The document feeding device 151 can be lifted up. As the document feeding device 151 is lifted up, the reading stage is exposed and can be used as a so-called flatbed type. Therefore, a user can directly set a document on the reading stage without using the document feeding device 151.

The multi-function peripheral 100 of this example has, as four main functions, a copy function of copying a document, a scanning function of reading a document, a facsimile function of transmitting an image obtained by reading a document as image data, and a printing function of printing an image on a paper sheet. In a case where processing related to the scanning function is executed in the multi-function peripheral 100, an image of a document is read by the reading unit 102, and image data is generated. In a case where processing related to the copy function is executed in the multi-function peripheral 100, the image forming unit 103 prints an image of a document on another paper sheet based on image data generated by the reading unit 102. The paper sheet on which an image is printed is discharged to a paper sheet discharging unit 152 provided in the main body 150. In a case where processing related to the facsimile function is executed in the multi-function peripheral 100, image data generated by the reading unit 102 is output to the communication unit 104 and transmitted to a destination via the communication unit 104. In a case where processing related to the printing function is executed in the multi-function peripheral 100, the image forming unit 103 prints an image on a paper sheet based on image data input from a personal computer or the like. The paper sheet on which an image is printed is discharged to the paper sheet discharging unit 152.

In addition, a feeding unit in which a paper sheet is loaded, a paper sheet transport mechanism that transports a paper sheet to the image forming unit 103 and the paper sheet discharging unit 152, and the like are provided inside the main body 150.

(Operation Panel 120)

The multi-function peripheral 100 includes the operation panel 120 for a user to operate the multi-function peripheral 100. The operation panel 120 is an example of a user interface. The user interface is a device for exchanging information between the multi-function peripheral 100 and a user, specifically, for inputting an operation instruction from a user to the multi-function peripheral 100 or displaying information such as a status of the multi-function peripheral 100 to a user.

Figure 3:
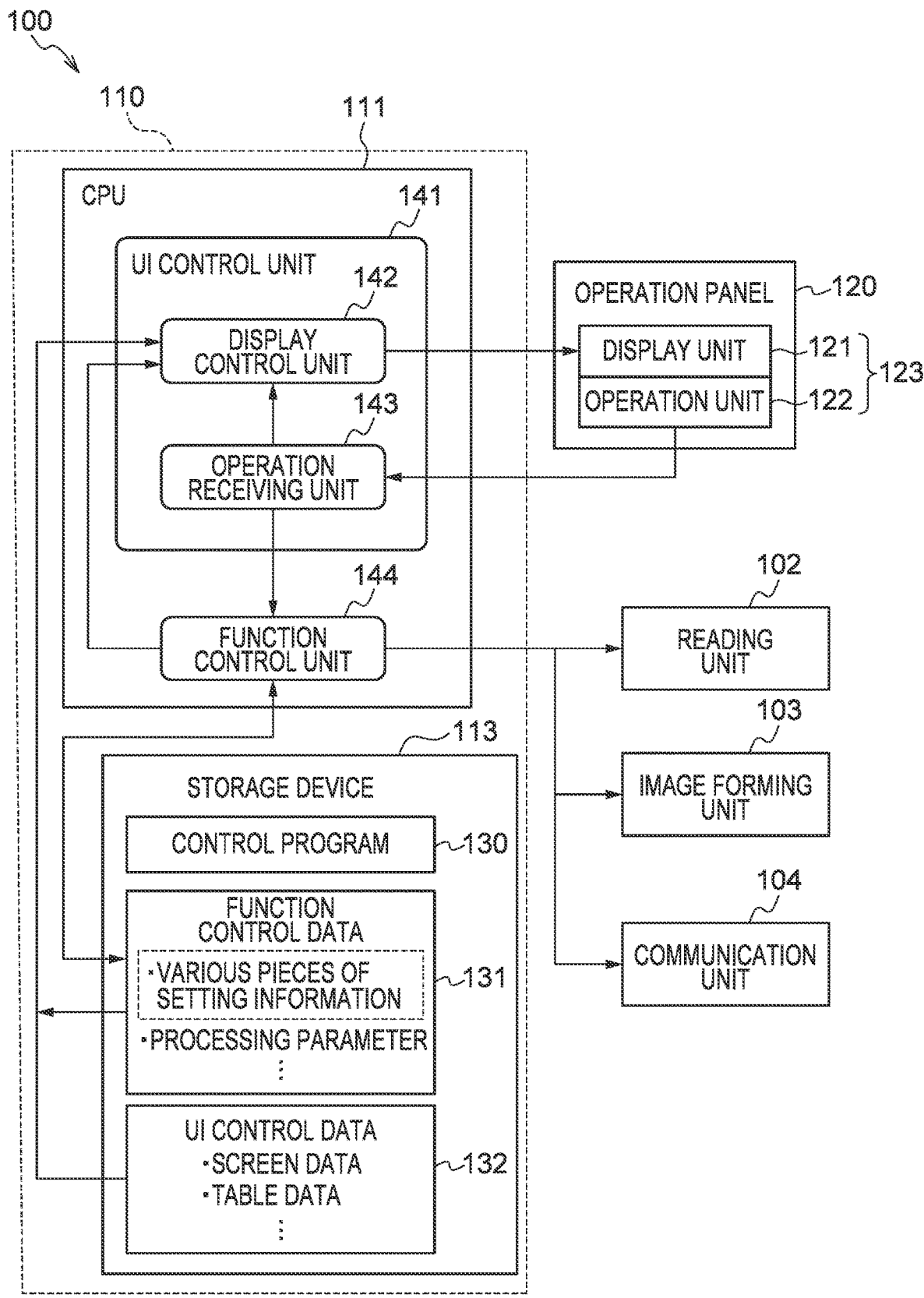
FIG. 3 is a block diagram illustrating a functional configuration of the display control device used in the multi-function peripheral according to the first embodiment.

In the present embodiment, specifically, the operation panel 120 includes a display unit 121 and an operation unit 122 as illustrated in FIGS. 2 and 3.

The display unit 121 displays an operation screen, various messages such as operation guidance, and the like. The operation unit 122 is a component on which a user performs an input operation. The display unit 121 is implemented by, for example, a liquid crystal display, an organic electro luminescence (EL) display, or the like. The operation unit 122 and the display unit 121 are implemented by a touch panel display 123 in which both the operation unit 122 and the display unit 121 are integrated. The operation unit 122 is a resistive type touch panel, a capacitive type touch panel, or the like, and detects a touch operation of a user. A region where an operation screen of the display unit 121 is displayed and a region where a touch operation of the operation unit 122 can be detected overlap with each other in the touch panel display 123. As a result, once a user performs a touch operation on an operation screen displayed on the display unit 121, the operation unit 122 detects the touch operation performed on the operation screen and a position at which the touch operation is performed on the operation screen, and outputs a detection signal to the control device 110.

Examples of the touch operation of the user include operations such as tapping, flicking, sliding, and dragging. The tapping operation is an operation of touching the screen of the display unit 121 with a finger. The flicking operation is an operation of touching the screen of the display unit 121 in such a way as to flick the screen with a finger. The sliding operation is an operation of moving a finger in a state of touching the screen of the display unit 121 with the finger. The dragging operation is an operation for moving an image such as an icon displayed on the display unit 121. The dragging operation is an operation of touching an image displayed on the display unit 121 with a finger, then moving the finger touching the image, and then releasing the finger from the image. The operation unit 122 that is a touch panel outputs, as a detection signal, a movement locus of a finger associated with these touch operations in an operation screen. Note that the touch operation may be not only an operation using a finger of a user but also an operation using a tool such as a touch pen. An operator can operate the multi-function peripheral 100 via an operation image (graphical user interface (GUI)) displayed on the operation panel 120. Furthermore, the multi-function peripheral 100 can be operated via an operation screen displayed on a display included in an external apparatus (not illustrated) in which an operation application for the multi-function peripheral 100 is installed.

The operation panel 120 further includes an operation key 124 disposed outside the screen of the display unit 121 as illustrated in FIG. 1. Examples of the operation key 124 include a power key for supplying power to the multi-function peripheral 100, a cancel key for canceling various executions, and the like. As described above, the operation panel 120 according to the first embodiment includes a mechanical operation unit in addition to the touch panel display 123 including the operation unit 122.

Figure 4:
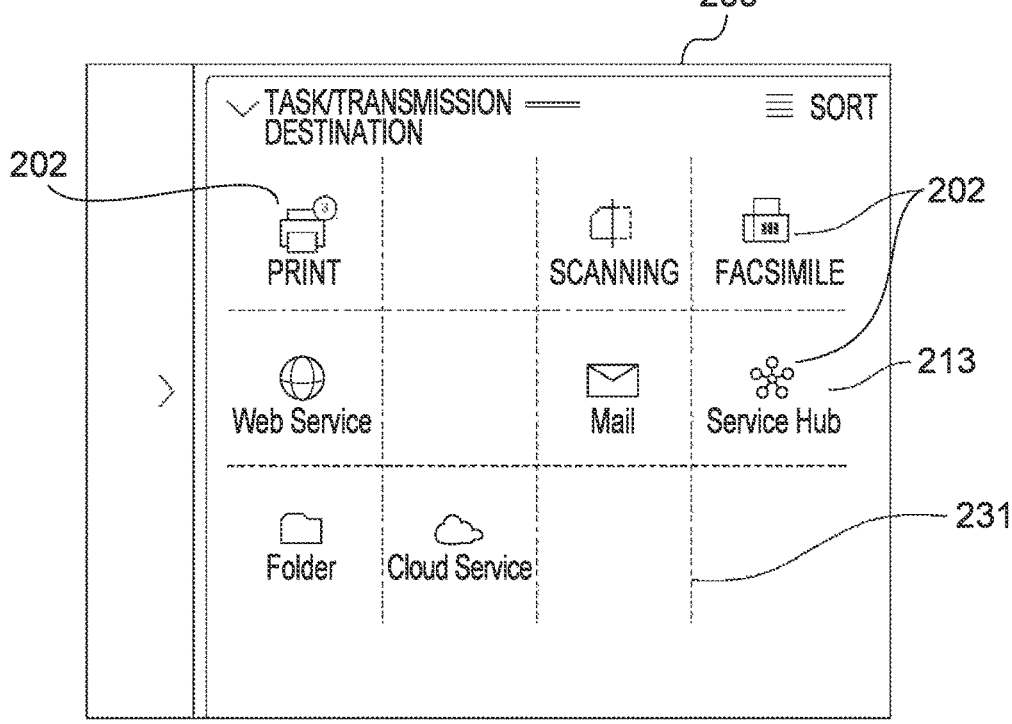
FIG. 4 is a view illustrating a top screen in an operation screen of the multi-function peripheral according to the first embodiment.

The display unit 121 can display, for example, various operation screens such as a function selection screen 200 illustrated in FIG. 4. The "operation screen" of the disclosure only needs to be a screen used for operating the multi-function peripheral 100, and is a concept including not only an operation screen for operation provided in the multi-function peripheral 100 itself but also a screen provided in an apparatus for remotely operating the multi-function peripheral 100.

(Control Device 110)

The control device 110 is a device that controls each unit of the multi-function peripheral 100 including the operation panel 120. Specifically, the control device 110 includes a central processing unit (CPU) 111, a memory 112, and a storage device 113 as illustrated in FIG. 2. The control device 110 controls the multi-function peripheral 100 based on information stored in the storage device 113.

The storage device 113 stores various programs including a control program 130 and various pieces of data including function control data 131 and user interface (UI) control data 132. The control program 130 is a program that causes a computer including the CPU 111 to function as the control device 110. The function control data 131 is data used to control the reading unit 102, the image forming unit 103, and the communication unit 104, and includes various pieces of setting information, processing parameters, and the like. The processing parameter is, for example, a parameter used when image correction processing such as gain correction, contrast correction, white balance correction, or gamma correction is executed.

The various pieces of setting information include setting information that specifies processing conditions for each of the copy function, the scanning function, the printing function, and the like implemented by the reading unit 102, the image forming unit 103, and the communication unit 104. For example, in the case of the copy function and the printing function, the setting information is setting information that specifies processing conditions such as paper sheet size setting and color setting (for example, black-and-white copy or color copy), and in the case of the scanning function, the setting information is setting information that specifies processing conditions such as reading resolution setting and color setting (for example, black-and-white reading or color reading). The setting information includes user setting information set by a user in addition to initial setting information. The various pieces of setting information also include a history of user setting information used by a user in the past.

The UI control data 132 includes various pieces of screen data for configuring an operation screen displayed by the display unit 121 and various pieces of table data defining various setting items and the like displayed in an operation screen. Specifically, the storage device 113 is implemented by a recording device such as a hard disk drive (HDD), a solid state drive (SSD), or a flash memory.

The memory 112 is a work area for the CPU 111 to execute various programs, and temporarily records various programs or various pieces of data when the CPU 111 executes processing. The memory 112 includes at least one of a read only memory (ROM), a random access memory (RAM), a hard disk drive (HDD), or the like as a storage medium. The CPU 111 reads various programs including the control program 130 from the storage device 113 to the memory 112, and executes the program by using the memory 112 as a work area.

In the control device 110, the CPU 111 executes the control program 130 to implement various functions for controlling the multi-function peripheral 100. Hereinafter, a functional configuration implemented by cooperation of the CPU 111 as a hardware resource and the control program 130 as a software resource will be described. FIG. 3 is a block diagram illustrating a functional configuration of the CPU 111, and is a block diagram mainly illustrating a functional configuration that implements control of the operation panel 120.

As illustrated in FIG. 3, in the control device 110, the CPU 111 functions as a UI control unit 141 and a function control unit 144 by executing the control program 130.

The function control unit 144 controls the reading unit 102, the image forming unit 103, and the communication unit 104 while referring to the function control data based on an operation instruction input from the UI control unit 141. In addition, the function control unit 144 outputs, to the UI control unit 141, a processing execution result in the reading unit 102, the image forming unit 103, and the communication unit 104, a status, and the like.

The UI control unit 141 receives an operation instruction input from the operation panel 120 and outputs the received operation instruction to the function control unit 144. The UI control unit 141 controls the touch panel display 123. The UI control unit 141 includes a display control unit 142 and an operation receiving unit 143 as the functional configuration.

The operation receiving unit 143 receives an operation instruction according to a user's operation input from the operation panel 120, the user's operation input including a user's touch operation detected by the operation unit 122 of the touch panel display 123.

The display control unit 142 performs control to display various operation screens on the display unit 121 of the touch panel display 123 with reference to the function control data 131 and the UI control data 132. The control device 110 including the display control unit 142 is an example of a display control device according to the technology of the disclosure.

Specifically, once the operation receiving unit 143 receives an operation of supplying power to the multi-function peripheral 100, the display control unit 142 displays the function selection screen 200 illustrated in FIG. 4 as an example. The function selection screen 200 is a selection screen for allowing a user to select various functions to be executed by the multi-function peripheral 100. The function selection screen 200 includes a plurality of sections 213 in which icons 202 corresponding to various functions to be executed by the multi-function peripheral 100 are disposed, and is a screen for a user to select an icon 202. In FIG. 4, a frame 231 of a section 213 is indicated by a broken line, but the broken line is not actually displayed. It is a matter of course that the frame 231 may be displayed.

The icons 202 displayed in the function selection screen 200 include icons for selecting four main functions of the multi-function peripheral 100, such as the printing function, the copy function, the facsimile function, and the scanning function.

Figure 5:
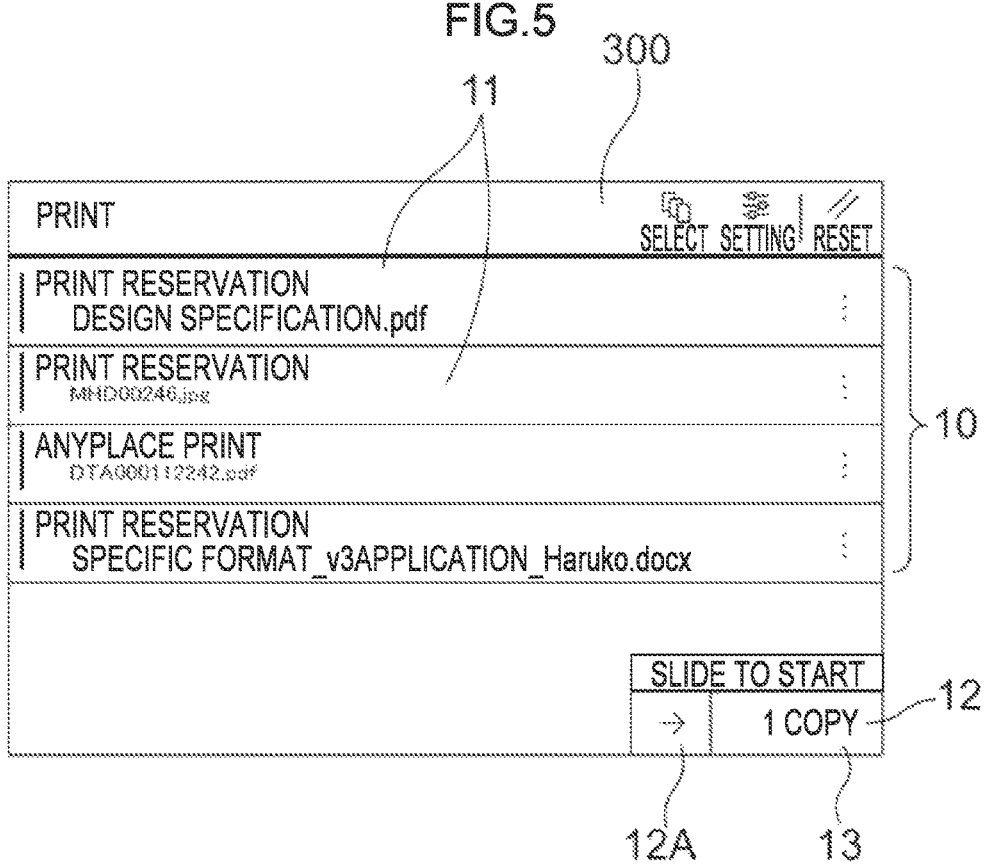
FIG. 5 is a view illustrating an execution screen corresponding to a printing function in the operation screen of the multi-function peripheral according to the first embodiment.

Once any of the icons 202 is selected in the function selection screen 200 illustrated in FIG. 4, a task selection screen 300 (see FIG. 5) for selecting a task corresponding to the function of the selected icon 202 is displayed. The task selection screen 300 illustrated in FIG. 5 is an example of the task selection screen 300 in a case where the icon 202 corresponding to the printing function is selected. A plurality of tasks 11 are arranged and displayed in a list form in the task selection screen 300.

Here, the task 11 is processing executed by the multi-function peripheral 100 after a user sets a processing condition for a main function of the multi-function peripheral 100. For example, in the case of the printing function, which is one of the main functions of the multi-function peripheral 100, processing executed by the multi-function peripheral 100 after a user sets the processing conditions such as a data file to be processed such as a sentence to be printed, paper sheet size setting, and color setting is the task of the printing function. Similarly, in the case of the facsimile function, processing executed by the multi-function peripheral 100 after a user sets the processing conditions such as a data file to be processed such as a document to be transmitted, a transmission destination, reading resolution setting, and color setting is the task of the facsimile function.

The task selection screen 300 is an example of an operation screen for selecting a task item for each function when a function such as the printing function (that is, printing) or the facsimile function is selected. A selection list 10 for tasks 11 for selecting a task 11 to be executed by the multi-function peripheral 100 which is the information processing apparatus is displayed in the task selection screen 300.

The task selection screen 300 illustrated in FIG. 5 is a task selection screen for print processing. Names of data files (that is, names of printable files) such as "design specification.pdf" and "MDH00246.jpg" are displayed as data files on which the print processing can be executed in the respective tasks 11 illustrated in FIG. 5. These are names of printable files. These data files are registered in the multi-function peripheral 100, for example, in a case where a print request is made from a personal computer or the like communicably connected to the multi-function peripheral 100 to the multi-function peripheral 100. In addition to the data files, various processing conditions are set for each task 11. The processing conditions may be individually set by a user, or initial setting can be used. A list of printable data files, processing conditions, and the like are recorded in various selection information of the function control data 131, and the like.

In the task selection screen 300 of FIG. 5, an arrangement order of the tasks 11 displayed in the selection list 10 is, for example, a registration order of the tasks 11. The arrangement order of the tasks 11 displayed in the selection list 10 does not have to be an order of registration, and, for example, the tasks 11 may be displayed in the order of use frequency. Alternatively, a history list based on the past use history of the tasks 11 may be displayed as the selection list 10.

A slide button 12 is displayed at the lower-right side of the task selection screen 300. The selection list 10 for the tasks 11 can be scrolled in a top-bottom direction. The slide button 12 is configured to be operated by a swipe operation in the lateral direction. In the first embodiment, the selection list 10 for the tasks 11 can be scrolled in the task selection screen 300. However, the selection list 10 for the tasks 11 does not have to be scrollable. In a case where scrolling is possible, scrolling in the vertical direction is common, and thus, in this case, the slide button 12 is configured to be operated by a sliding operation (swipe operation) in the lateral direction. Instead of the above-described configuration, in the case of scrolling in the lateral direction, the slide button is preferably operated by a swipe operation in the vertical direction. This is to prevent the slide button from being erroneously operated by a scroll operation.

Once a desired task 11 is selected from the selection list 10 for the tasks 11 and tapped, the number of copies to be printed 13 recorded in advance corresponding to the selected task 11 is displayed in the slide button 12. For example, the number of copies to be printed 13 is displayed as "1 copy" stored in the initial setting. A user can confirm the number of copies to be printed 13 as the number of copies to be printed 13 is displayed in the slide button 12. In a case where it is desired to change the number of copies to be printed 13, once the slide button 12 is tapped, transition to a number-of-copies-to-be-printed change screen (for example, a numeric keypad screen on which the number of copies to be printed 13 can be changed) (not illustrated) is made.

Once the number-of-copies-to-be-printed change screen is closed after setting the number of copies to be printed 13 in the number-of-copies-to-be-printed change screen, the changed number of copies to be printed 13 is displayed in the slide button 12. A user confirms the number of copies to be printed 13, and instructs execution of a task corresponding to the task 11 by swiping the slide button 12.

The slide button 12 functions as an execution button 12A for executing a task until being swiped. As an example, an arrow "→" as the execution button 12A is displayed in the slide button 12.

As described above, the selection list 10 for the tasks 11 for selecting a task 11 to be executed by the multi-function peripheral 100 and the slide button 12 as the execution button 12A for instructing execution of a task 11 corresponding to the selected task 11 are simultaneously displayed in the task selection screen 300 illustrated in FIG. 5.

The slide button 12 as the execution button 12A is displayed after a desired task 11 is selected by operation of the selection list 10 in the task selection screen 300.

In the multi-function peripheral 100, in a case where a task 11 of executing the printing function (that is, the printing function) is selected, the display control unit 142 of the CPU 111 performs control such that the number of copies to be printed 13 is displayed in the slide button 12 after the selection of the task 11 in the task selection screen 300 for the printing function. The task selection screen 300 illustrated in FIG. 5 is an example of an execution screen in a case where a task for which the printing function (that is, the printing function) is to be executed is selected.

In the multi-function peripheral 100, the operation receiving unit 143 of the CPU 111 performs control such that the number of copies to be printed 13 can be changed once the slide button 12 in which the number of copies to be printed 13 is displayed is operated.

Figure 6:
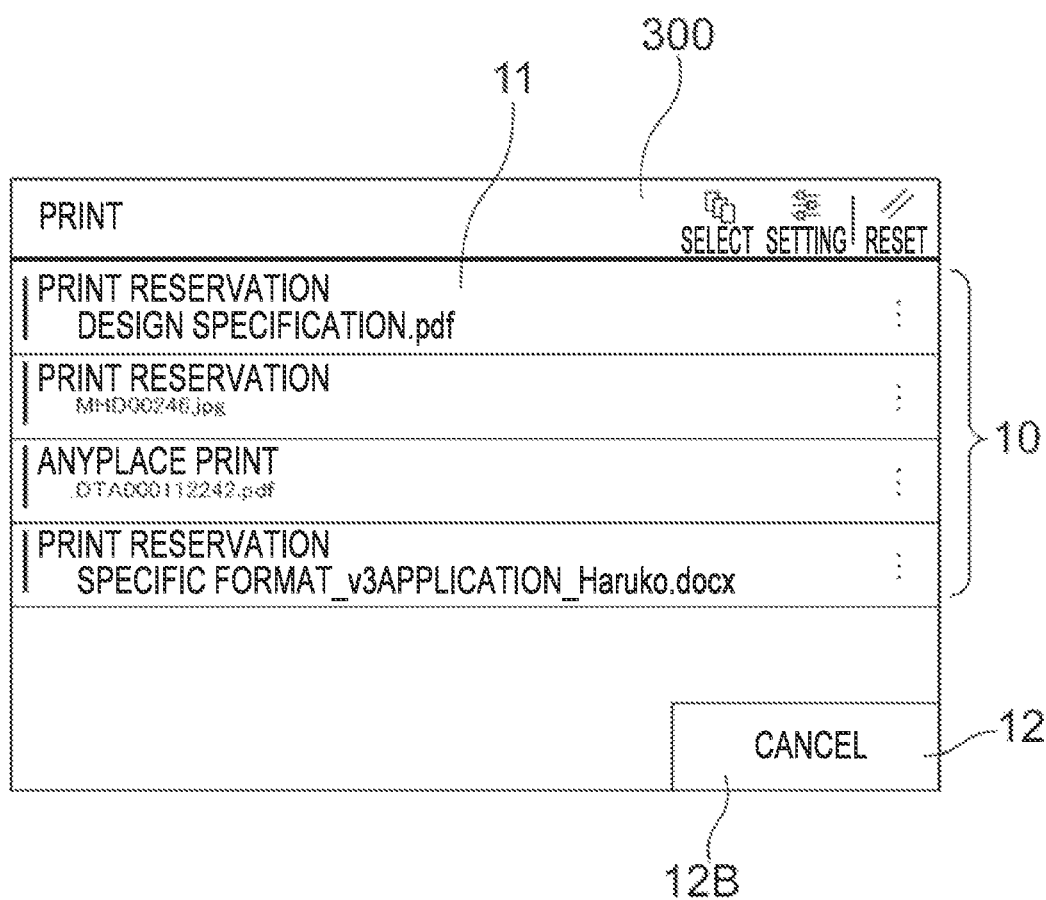
FIG. 6 is a view illustrating a cancel screen corresponding to the printing function in the operation screen of the multi-function peripheral according to the first embodiment.

Once the slide button 12 is swiped in the task selection screen 300 illustrated in FIG. 5, the operation receiving unit 143 of the CPU 111 detects the operation of the slide button 12 as the execution button 12A. Once the operation receiving unit 143 detects the operation of the execution button 12A, the display control unit 142 transmits a signal for changing the slide button 12 so as to function as a cancel button 12B for canceling execution of a task 11. As a result, transition from the task selection screen 300 illustrated in FIG. 5 to the task selection screen 300 illustrated in FIG. 6 is made. Specifically, the slide button 12 is changed to be displayed as the cancel button 12B that can be recognized as a button for canceling execution of a task 11 in the task selection screen 300 illustrated in FIG. 6.

The slide button 12 changed to function as the cancel button 12B is configured to function as a tap button, for example. Once the slide button 12 is tapped, a signal for stopping execution of a task 11 is transmitted to the function control unit 144 of the CPU 111, and the task 11 is canceled.

The function control unit 144 of the CPU 111 instructs execution of the task in a case where the slide button 12 functioning as the cancel button 12B is not operated within a preset time. As a result, the task 11 is executed.

As described above, once an operation of instructing execution of a task by the execution button 12A of the slide button 12 is detected, the CPU 111 performs control such that the slide button 12 is changed to the cancel button 12B for canceling a task 11 that is being executed.

In a case where a preset specific task 11 is selected from the tasks 11 of the selection list 10, the slide button 12 functioning as the execution button 12A is changed to be displayed as a tap button functioning as the cancel button 12B.

In the multi-function peripheral 100, in the case of an information processing apparatus operated based on user authentication, it is preferable that the CPU 111 learns the width, time, and the like of a swipe operation for execution instruction based on an operation history of a user to adjust a timing of detection as an execution signal, thereby improving convenience of an individual user. A display time, that is, an execution waiting time of the cancel button is preferably adjusted according to a cancel button use frequency of an individual user.

Next, the operation of the multi-function peripheral 100 will be described with reference to the flowchart of FIG. 7.

Figure 7:
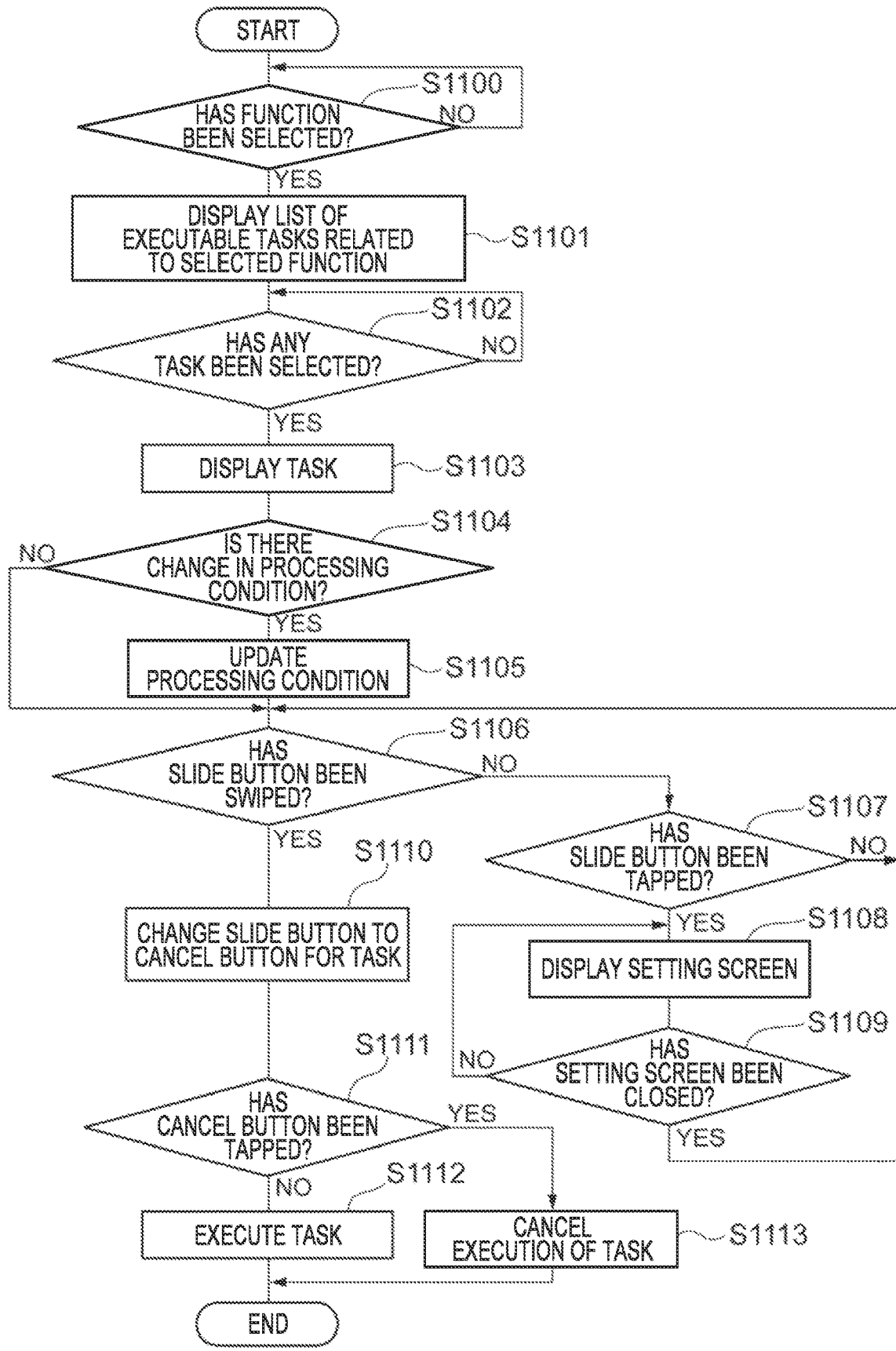
FIG. 7 is a flowchart illustrating a flow of main function control processing executed by a control device.

FIG. 7 is a flowchart illustrating a flow of control processing for a main function executed by the CPU 111 of the control device 110. As illustrated in FIG. 7, the CPU 111 determines whether or not a function has been selected (Step S1100). For example, in a case where the printing function (that is, the printing function) has been selected as one of the main functions in the function selection screen 200 illustrated in FIG. 4, the CPU 111 determines that a function has been selected.

In a case where no function has been selected (NO in Step S1100), the CPU 111 waits until any of the main functions is selected.

In a case where a function has been selected (YES in Step S1100), the CPU 111 displays a list of executable tasks 11 related to the selected function (Step S1101). For example, as illustrated in FIG. 5, in a case where the printing function has been selected, the CPU 111 displays a selection list 10 for tasks 11 for which the printing function is executable in the task selection screen 300.

The CPU 111 determines whether or not any task 11 has been selected (Step S1102). For example, in a case where a specific task 11 has been selected from the selection list 10 in the task selection screen 300 illustrated in FIG. 5, the CPU 111 determines that any task 11 has been selected.

In a case where no task 11 has been selected (NO in Step S1102), the CPU 111 waits until any task is selected.

In a case where any task 11 has been selected (YES in Step S1102), the CPU 111 displays the selected task 11 so as to be distinguishable from other tasks 11 in the selection list 10 (Step S1103). For example, the selected task 11 may be displayed in a different color from those of other tasks 11, whereby the selected task 11 can be identified. For example, in a case where any task 11 has been selected, the CPU 111 may display the slide button 12 functioning as the execution button 12A in the task selection screen 300 illustrated in FIG. 5.

The CPU 111 determines whether or not there is a change in processing condition (Step S1104). Examples of the processing condition include a black-and-white printing or color printing condition, an N-up condition for printing a plurality of pages on one sheet, and a printing scale condition.

In a case where there is a change in processing condition (YES in Step S1104), the CPU 111 updates the processing condition according to a change content (Step S1105).

In a case where there is no change in processing condition (NO in Step S1104), the CPU 111 proceeds to the processing of Step S1106.

The CPU 111 determines whether or not the slide button 12 functioning as the execution button 12A has been swiped (Step S1106).

In a case where the slide button 12 is not swiped (NO in Step S1106), the CPU 111 determines whether or not the slide button 12 has been tapped (Step S1107).

In a case where the slide button 12 is not tapped (NO in Step S1107), the CPU 111 returns to Step S1106.

In a case where the slide button 12 has been tapped (YES in Step S1107), the CPU 111 displays a setting screen (Step S1108). For example, in a case where the printing function has been selected, the number-of-copies-to-be-printed change screen (not illustrated) on which the number of copies to be printed 13 can be changed is displayed. The number of copies to be printed can be changed by the number-of-copies-to-be-printed change screen.

The CPU 111 determines whether or not the setting screen has been closed (Step S1109). In a case where the setting screen has not been closed (NO in Step S1109), the CPU 111 returns to the processing of Step S1108.

In a case where the setting screen has been closed (YES in Step S1109), the CPU 111 returns to the processing of Step S1106. For example, once the number-of-copies-to-be-printed change screen (not illustrated) on which the number of copies to be printed 13 can be changed is closed, the number of copies is updated to the number of copies to be printed 13 when the number-of-copies-to-be-printed change screen is closed.

In a case where the slide button 12 has been swiped (YES in Step S1106), the CPU 111 changes the execution button 12A of the slide button 12 to the cancel button 12B for the task 11 (Step S1110). For example, the task selection screen 300 illustrated in FIG. 5 is changed such that the slide button 12 is changed to be displayed as the cancel button 12B for the task 11 as in the task selection screen 300 illustrated in FIG. 6. As an example, the cancel button 12B functions as a tap button.

The CPU 111 determines whether or not the cancel button 12B has been tapped (Step S1111). For example, the CPU 111 determines whether or not the cancel button 12B has been tapped within a preset time. For example, within the preset time, the cancel button 12B is displayed, and execution of the task 11 is suspended in a state of waiting for a cancel instruction for the task 11. In this case, the preset time is the execution waiting time.

In a case where the cancel button 12B is not tapped (NO in Step S1111), the CPU 111 executes the task 11 (Step S1112). For example, in a case where the cancel button 12B is not tapped within the preset time, the task 11 is executed. That is, once the execution waiting time elapses, the task 11 is executed, and the slide button 12 returns to a state of functioning as the execution button 12A. As a result, the CPU 111 ends the control processing for the selected function.

In a case where the cancel button 12B has been tapped (YES in Step S1111), the CPU 111 cancels the execution of the task 11 (Step S1113). For example, in a case where the cancel button 12B has been tapped within the preset time, the execution of the task 11 is canceled. For example, a cancel instruction signal is transmitted from the function control unit 144 of the CPU 111 to the image forming unit 103, and the execution instruction for the task 11 is canceled. As a result, the CPU 111 ends the control processing for the selected function.

As described above, in the multi-function peripheral 100 according to the first embodiment, the CPU 111 simultaneously displays the selection list 10 for the tasks 11 for selecting a task 11 to be executed by the multi-function peripheral 100 and the slide button 12 as the execution button 12A for instructing execution of a task 11 corresponding to the selected task 11 in the task selection screen 300 illustrated in FIG. 5. Once an operation of instructing execution of a task 11 by the execution button 12A of the slide button 12 is detected, the CPU 111 performs control such that the slide button 12 is changed to the cancel button 12B for canceling a task 11 that is being executed. Therefore, in the multi-function peripheral 100, the cancel button 12B can be operated immediately after operating the execution button 12A without moving a finger between the execution button 12A and the cancel button 12B for a task 11.

Since the execution button 12A for a task 11 is the slide button 12, for example, even in a case where an operation is performed on a narrow screen such as a mobile operation panel, an erroneous operation is less likely to occur. Further, since the execution button 12A is changed to the cancel button 12B after the operation of the execution button 12A, it is possible to quickly operate the cancel button 12B.

In the multi-function peripheral 100, the CPU 111 displays the slide button 12 as the execution button 12A after a desired task 11 is selected by operation of the selection list 10 in the task selection screen 300. Therefore, in the multi-function peripheral 100, the slide button 12 as the execution button 12A is prevented from being operated before a task 11 is selected.

In the multi-function peripheral 100, in a case where a specific task 11 is selected from the tasks 11 of the selection list 10, the CPU 111 performs control such that the slide button 12 functioning as the execution button 12A is changed to be displayed as a tap button functioning as the cancel button 12B. Therefore, execution of a task 11 can be canceled by a quicker operation of tapping the cancel button 12B as compared with the case of sliding a cancel button as a slide button.

In the multi-function peripheral 100, the CPU 111 performs control such that the number of copies to be printed 13 is displayed in the slide button 12 after the selection of the task 11 in the task selection screen 300 that is an execution screen for the printing function. Therefore, in the multi-function peripheral 100, it is possible to confirm the number of copies to be printed 13 after a task 11 is selected.

In the multi-function peripheral 100, the CPU 111 performs control such that the number of copies to be printed 13 can be changed once the slide button 12 in which the number of copies to be printed 13 is displayed is operated. Therefore, in the multi-function peripheral 100, it is possible to change the number of copies to be printed 13 by operating the slide button 12.

In the multi-function peripheral 100 according to the first embodiment, the slide button 12 is displayed after a task 11 is selected by the operation of the selection list 10, but a configuration in which a slide button is always present in a task selection screen for selecting a task 11 is also possible.

In the multi-function peripheral 100 according to the first embodiment, the slide button 12 is changed to a tap button functioning as the cancel button 12B. Alternatively, the disclosure may have a configuration in which the slide button 12 is changed to a slide button functioning as a cancel button, and execution of a task 11 is canceled by swiping the slide button.

In the multi-function peripheral 100 according to the first embodiment, setting of a threshold (for example, the width, speed, or the like (the amount of change per unit time) of a stroke of a slide operation) for detecting an execution instruction for a task 11 can be changed in the slide button 12, if appropriate. It is preferable that a threshold of a time for which a function of canceling execution of a task 11 is exhibited can be learned according to a frequency of cancellation of the execution instruction.

As described above, in the task selection screen 300, the selection list 10 may not only be a selection list 10 in which tasks 11 are arranged in the order of registration, but also be a selection list 10 in which tasks 11 are arranged in the order of use frequency. A history list based on the past use history of tasks 11 may also be displayed as the selection list 10.

In the multi-function peripheral 100 according to the first embodiment, since the canceling function is unnecessary for a task 11 for which cancellation of the execution instruction is unlikely to occur, in a case where such a task 11 is selected, the slide button may disappear and a tap button that is easy to operate may be displayed. Accordingly, a quick operation can be performed by operating the tap button.

Second Embodiment

Next, a multi-function peripheral 100 according to a second embodiment will be described. In the second embodiment, the same components, members, and the like as those of the first embodiment are denoted by the same reference signs, and a detailed description thereof is omitted.

Figure 8:
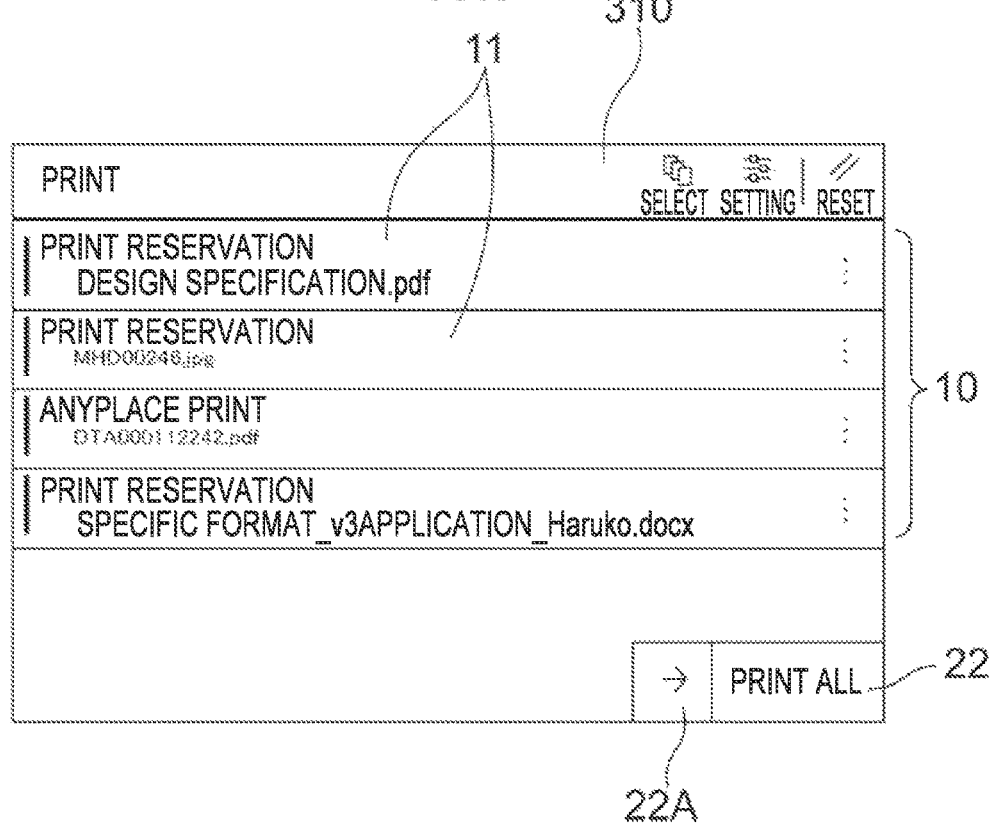
FIG. 8 is a view illustrating an initial screen corresponding to a printing function in an operation screen of a multi-function peripheral according to a second embodiment.

The multi-function peripheral 100 according to the second embodiment differs from the multi-function peripheral 100 according to the first embodiment in the operation screen in a case where a task related to the printing function (that is, the printing function) is selected. FIG. 8 illustrates a task selection screen 310 as an example of an operation screen in a case where a task related to the printing function is selected in the multi-function peripheral 100 according to the second embodiment. In the multi-function peripheral 100 according to the second embodiment, a CPU 111 performs control such that all printable files recorded in function control data 131 can be collectively printed.

As illustrated in FIG. 8, names of printable files recorded in the function control data 131 are displayed in a selection list 10 of tasks 11 in the task selection screen 310. A slide button 22 functioning as an execution button 22A is displayed on the lower-right side of the task selection screen 310. "Print all" is displayed in the slide button 22, and once the slide button 22 is swiped, all the tasks 11 displayed in the selection list 10 are executed.

After performing an execution operation on the slide button 22, the slide button 22 is changed to be displayed as having the function of the cancel button 12B (see FIG. 6) for canceling execution of a task 11, similarly to the multi-function peripheral 100 according to the first embodiment. The number of copies to be printed may be displayed in the slide button 22 together with "print all", in the task selection screen 310.

Figure 9:
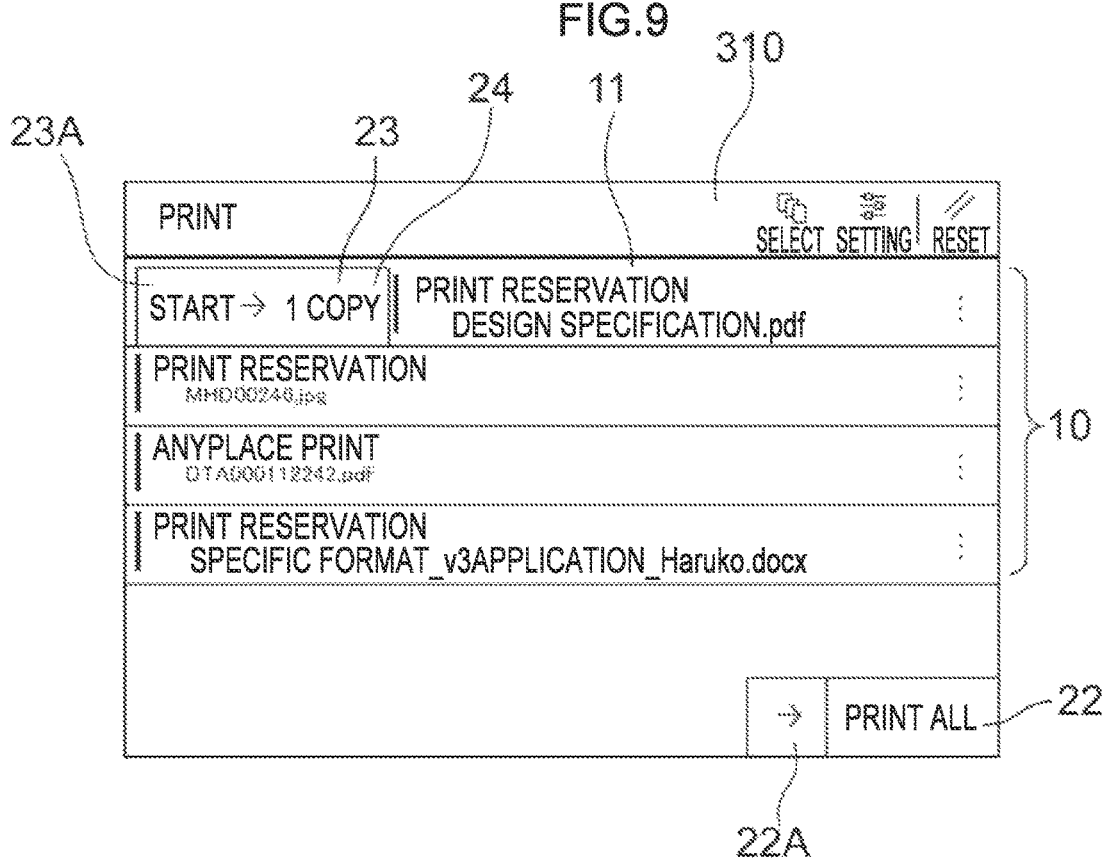
FIG. 9 is a view illustrating an execution screen for an individual task corresponding to the printing function in the operation screen of the multi-function peripheral according to the second embodiment.

In the case of printing only a specific task among the tasks 11 on which the names of the printable files are displayed, a displayed task 11 is swiped. Once the operation receiving unit 143 detects an operation of swiping the task 11, a signal indicating that the specific task 11 has been selected is input to the display control unit 142. As a result, as illustrated in FIG. 9, a slide button 23 as an execution button 23A is displayed in the same row as that in which the selected task 11 is displayed, in the task selection screen 310.

The number of copies to be printed 24 is displayed in the slide button 23. Subsequent processes until printing of the task 11 is executed by operating the slide button 23 are similar to those of the multi-function peripheral 100 according to the first embodiment.

The multi-function peripheral 100 according to the first embodiment and the multi-function peripheral 100 according to the second embodiment are selectively adopted, and a user may select and register one of the processings if desired.

The multi-function peripheral 100 according to the second embodiment can obtain the following effects in addition to the effects of the configuration similar to that of the multi-function peripheral 100 according to the first embodiment.

In the multi-function peripheral 100 according to the second embodiment, the slide button 23 is controlled so as to be displayed in the same row as that in which the selected task 11 is displayed. Therefore, it is easier to operate the slide button 23 after a task 11 is selected, as compared with a case where a slide button is displayed at a position away from a selected task 11.

Third Embodiment

Next, a multi-function peripheral 100 according to a third embodiment will be described. In the third embodiment, the same components, members, and the like as those of the first and second embodiments are denoted by the same reference signs, and a detailed description thereof is omitted.

Figure 10:
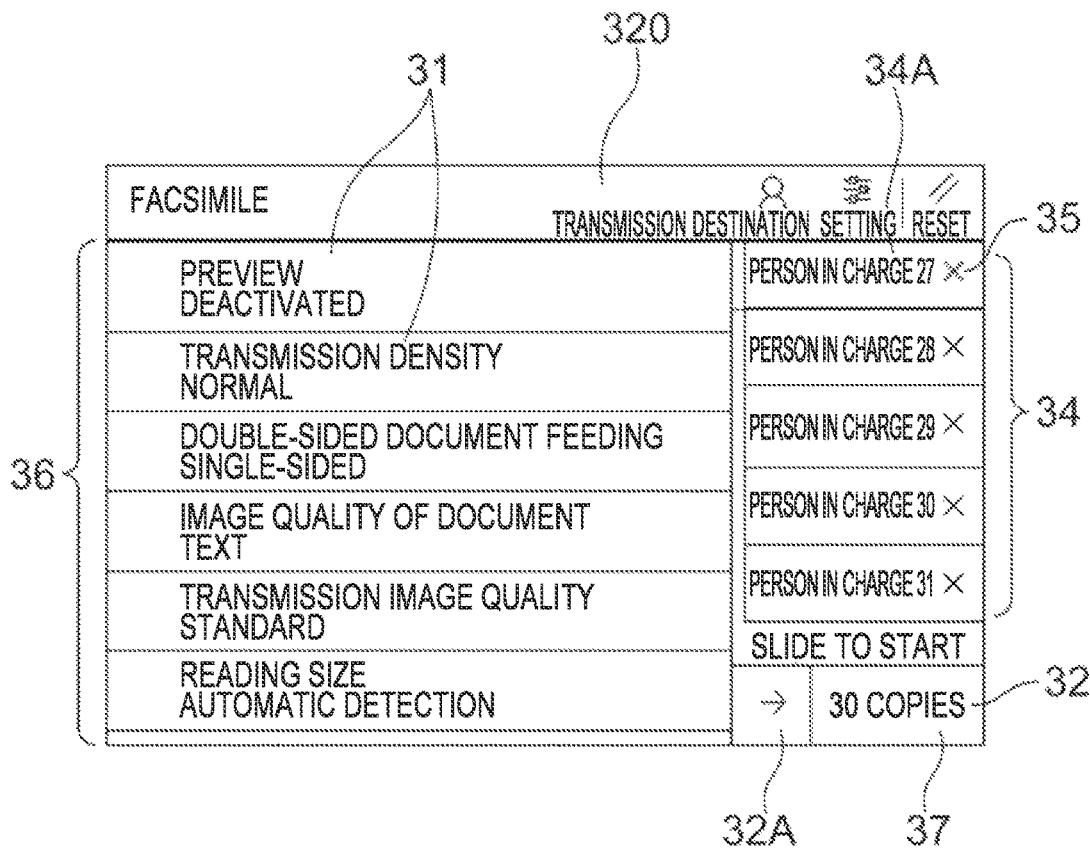
FIG. 10 is a view illustrating an execution screen corresponding to a facsimile function in an operation screen of a multi-function peripheral according to a third embodiment.

In the multi-function peripheral 100 according to the third embodiment, for example, an example in which a task for the facsimile function is selected is added in addition to an example in which a task for the printing function of the multi-function peripheral 100 according to the first embodiment is selected. FIG. 10 illustrates an execution screen 320 which is an operation screen in a case where a task for the facsimile function is selected in the multi-function peripheral 100 according to the third embodiment. The execution screen 320 is an example of an operation screen in a case where a task for which the facsimile function is to be executed is selected.

In the multi-function peripheral 100 according to the third embodiment, function control data 131 of a CPU 111 stores setting items for setting transmission conditions for the facsimile function. Examples of the setting items include "activation/deactivation of preview", "transmission density", "double-sided or single-sided document feeding", "image quality of document", "transmission image quality", and "reading size". The function control data 131 of the CPU 111 stores transmission destination list information regarding transmission destination information such as a recipient name and an address of a transmission destination.

The execution screen 320 illustrated in FIG. 10 is, for example, a screen displayed after an icon 202 corresponding to the facsimile function is selected in the function selection screen 200 illustrated in FIG. 4 and a desired task is selected from a task list in a task selection screen (not illustrated). In the task selection screen for the facsimile function, a data file to be transmitted and a transmission destination (individual or group) are set as processing conditions for a task. A display control unit 142 of the CPU 111 performs control to display the execution screen 320 illustrated in FIG. 10 on a display unit 121 in a case where a data file to be transmitted is selected as one of the processing conditions for a task for the facsimile function.

As illustrated in FIG. 10, a transmission destination list 34 is displayed on the right side of the execution screen 320. The transmission destination list 34 is a list of transmission destinations 34A that need to be set as the processing condition for a task for the facsimile function. A cancel button 35 is displayed for each transmission destination 34A. A setting button 36 related to a setting item 31 for setting a condition of a document to be transmitted and the like is displayed on the left side of the execution screen 320. The setting item 31 is one of transmission conditions that are the processing conditions for a task for the facsimile function. A slide button 32 is disposed on the lower-right side of the execution screen 320. Once a user selects a transmission condition and a transmission destination, the number of transmission destinations 37 is displayed in the slide button 32. As an example, a file of information regarding the transmission destinations 34A is generated for each user and recorded in the function control data 131 of the CPU 111. The display control unit 142 of the CPU 111 loads a file corresponding to a user and displays the file on the display unit 121.

Once the slide button 32 functioning as an execution button 32A is swiped in this state, a task execution signal is transmitted to an operation receiving unit 143 of the CPU 111, and the function of the slide button 32 is changed to the function of the cancel button, which is similar to the multi-function peripheral 100 according to the first embodiment.

The multi-function peripheral 100 according to the third embodiment can obtain the following effects in addition to the effects of the configuration similar to that of the multi-function peripheral 100 according to the first embodiment.

In the multi-function peripheral 100 according to the third embodiment, in a case where a task for which the facsimile function is to be executed is selected, the number of transmission destinations 37 is displayed in the slide button 32 after a task of a transmission destination 34A is selected, and the transmission destination list 34 is displayed in the execution screen 320 for the facsimile function. Therefore, it is easy to confirm the number of transmission destinations 37 and to operate the slide button 32.

Fourth Embodiment

Next, a multi-function peripheral 100 according to a fourth embodiment will be described. In the fourth embodiment, the same components, members, and the like as those of the first to third embodiments are denoted by the same reference signs, and a detailed description thereof is omitted.

Figure 11:
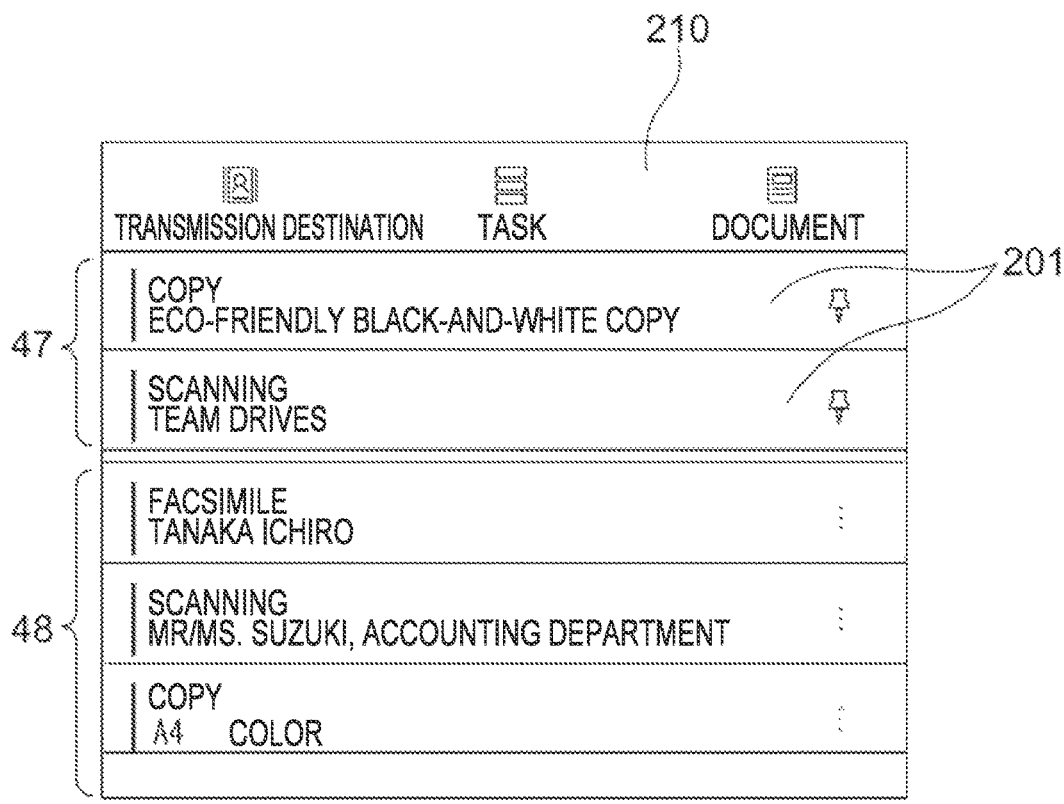
FIG. 11 is a diagram illustrating a home screen in which a priority list and a history list are displayed in an operation screen of a multi-function peripheral according to a fourth embodiment.

In the multi-function peripheral 100 according to the fourth embodiment, a task selection screen 210 illustrated in FIG. 11 is displayed as a modified example of the task selection screen. The task selection screen 210 illustrated in FIG. 11 and the task selection screen 300 illustrated in FIG. 5 are common in that a task selection list in which selectable tasks are displayed in a list form is included, and a difference therebetween is that tasks for each function such as the printing function are displayed in the task selection screen 300, whereas functions of displayed tasks are mixed in the task selection screen 210. The task selection screen 210 illustrated in FIG. 11 may be used instead of or in addition to the task selection screen 300 illustrated in FIG. 5.

As illustrated in FIG. 11, a priority list 47 which is a list of tasks 201 having a high use frequency regardless of the function and a history list 48 of tasks 201 based on a use history are displayed in the task selection screen 210. A slide button is not displayed in an initial state in the task selection screen 210. As an example, the priority list 47 of the tasks 201 having a high use frequency and the history list 48 of the tasks 201 based on the use history are recorded as individual files for each user in function control data 131 of a CPU 111. The two files are integrated and displayed in a screen by a display control unit 142 of the CPU 111, and can be scrolled integrally.

Figure 12:
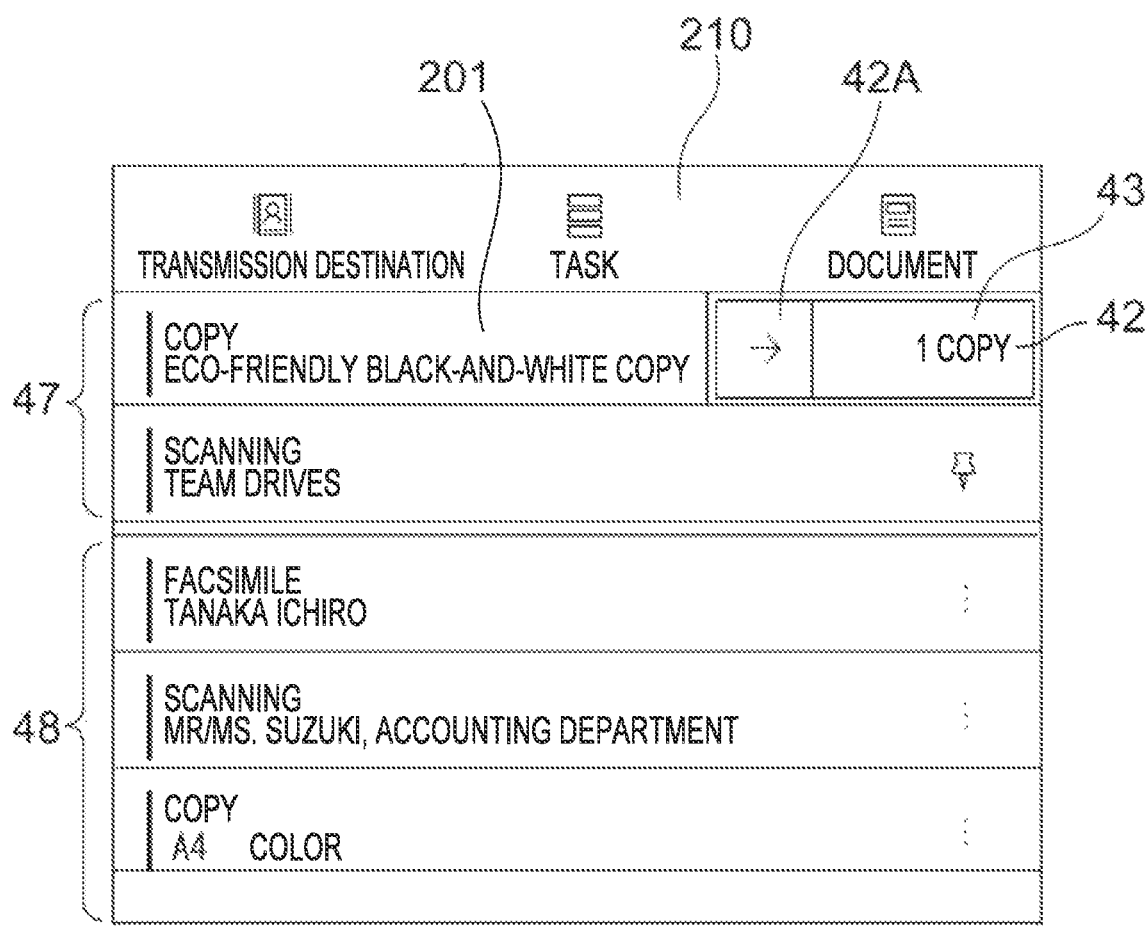
FIG. 12 is a view illustrating an execution screen corresponding to the priority list and the history list in the operation screen of the multi-function peripheral according to the fourth embodiment.

Once a user selects a specific task 201 and performs a tapping operation or swipe operation, the task selection screen 210 illustrated in FIG. 11 is changed to a task selection screen 210 illustrated in FIG. 12. A slide button 42 functioning as an execution button 42A is displayed in the same row as that in which the selected task 201 is displayed in the task selection screen 210 illustrated in FIG. 12. In the example illustrated in FIG. 11, since the copy function is selected, the number of copies 43 is displayed in the slide button 42.

Here, in the case of changing the number of copies 43, the number of copies can be changed by loading a number-of-copies-to-be-printed change screen (not illustrated) by tapping the slide button 42, which is similar to the case of the printing function in the multi-function peripheral 100 according to the first embodiment.

Once the slide button 42 is swiped after the number of copies 43 is confirmed, the function of the slide button 42 is changed to the function of the cancel button by a signal from the display control unit 142 of the CPU 111, and the task 201 is executed after a preset time elapses, which is similar to the multi-function peripheral 100 according to the first embodiment.

The multi-function peripheral 100 according to the fourth embodiment can obtain the following effects in addition to the effects of the configuration similar to that of the multi-function peripheral 100 according to the first embodiment.

In the multi-function peripheral 100 according to the fourth embodiment, since the slide button 42 is displayed in the same row as that in which a specific task 201 is displayed after the task 201 is selected by operating the tasks 201 in a list form, and thus, the slide button 42 is easily operated.

In the multi-function peripheral 100 according to the fourth embodiment, the CPU 111 may vary the amount of operation for reaction between a specific task 201 and a normal task 201. For example, in the case of performing a swipe operation when selecting the specific task 201, a reaction is not made unless a swipe distance is longer than that for the normal task 201. By doing so, in a case where the amount of swipe operation for the specific task 201 is the same as the amount of swipe operation for the normal task 201, a change from the task selection screen 210 of FIG. 11 to the task selection screen 210 of FIG. 12 does not occur, or an instruction to execute the task 201 is not input. In this manner, control may be performed such that the amount of operation in which each of the specific task 201 and the normal task 201 reacts can be switched.

The multi-function peripherals 100 according to the first to fourth embodiments are not limited to the above-described configurations, and the following changes are possible.

The CPU 111 may perform control so as to skip a change of the slide button to the function of the cancel button in a case where a possibility that a selected task is canceled is low. For example, the CPU 111 may control the storage device 113 to store a task for which a change to the function of the cancel button is to be skipped, and transmit a skip signal in a case where a selected task corresponds to the task. In this case, once the slide button is swiped, the task is executed without a change to the cancel button.

In the case of skipping the cancel button, the operation receiving unit 143 of the CPU 111 that has received a selection signal for a task transmits a signal for changing the slide button to the tap button so that the task can be executed by a tapping operation, as a result of which speed is increased.

The CPU 111 may perform control such that the operation screen such as the task selection screen itself has a slide button function, so that a task is executed by operation of the slide button as usual in a case where a swipe distance is short, and a task is executed only by a swipe operation regardless of a task content in a case where the swipe distance is long.

As described above, the information processing apparatus according to the disclosure need not to have a configuration in which the slide button is changed to the cancel button for all tasks.

The multi-function peripherals 100 according to the first to fourth embodiments have the copy function, the scanning function, the facsimile function, and the printing function, but the technology of the disclosure is not limited thereto. For example, an information processing apparatus having two or more of the copy function, the scanning function, the facsimile function, and the printing function may be used. The information processing apparatus according to the disclosure may have other main functions (for example, telephone communication) other than the copy function, the scanning function, the facsimile function, and the printing function.

In the above-described embodiments, for example, as a hardware structure of a processing unit that executes various processings such as the UI control unit 141, the display control unit 142, the operation receiving unit 143, and the function control unit 144, various processors described below can be used. Examples of the various processors include, in addition to the CPU 111 which is a general-purpose processor that functions as various processing units by executing software (program), a programmable logic device (PLD) in which a circuit configuration can be changed after manufacturing, such as a field programmable gate array (FPGA) and a dedicated circuitry which is a processor having a dedicated circuit configuration designed for executing specific processing, such as an application specific integrated circuit (ASIC).

The various processings may be executed by one of these various processors, or may be executed by a combination of two or more processors of the same type or different types (for example, a plurality of FPGAs and a combination of a CPU and an FPGA). A plurality of processing units may be implemented by one processor. As an example in which a plurality of processing units are implemented by one processor, a processor that implements a function of the entire system including a plurality of processing units with one integrated circuit (IC) chip, such as a system on chip (SoC), may be used.

As described above, the various processing units are implemented using one or more of the various processors as a hardware structure.

More specifically, a circuitry obtained by combining circuit elements such as semiconductor elements can be used as the hardware structure of these various processors.

The technology of the disclosure is also applicable to a computer-readable storage medium (a universal serial bus (USB) memory, a digital versatile disc (DVD)-read only memory (ROM), or the like) that non-transiently stores a control program of the control device, in addition to the control program of the control device.

The disclosure is not limited to the above-described embodiments, and various modifications, changes, and improvements can be made without departing from the gist of the disclosure. For example, the above-described modified examples may be configured by combining a plurality of embodiments, if appropriate.

The disclosure of Japanese Patent Application No. 2019-239027 filed on Dec. 27, 2019 is incorporated herein by reference in its entirety. All documents, patent applications, and technical standards mentioned herein are incorporated herein by reference to the same extent as if each individual document, patent application, and technical standard were specifically and individually stated.

INDUSTRIAL APPLICABILITY

The technology of the disclosure enables quick cancellation in a case where there is an error in task execution operation in an information processing apparatus or the like, and has industrial applicability.

The invention claimed is:
1. An information processing apparatus comprising;
a control device that comprises a processor and a memory coupled to or integrated with the processor and controls an information processing apparatus,
wherein the processor is configured to:

simultaneously display, in an operation screen, a selection list of tasks for selecting a task to be executed by the information processing apparatus and a slide button as an execution button for instructing execution of the selected task, and once an operation of instructing execution of the task by the slide button is detected, perform control to change the slide button to a cancel button for canceling the task that is being executed; and a printer, wherein, in a case in which a task for which a printing function is to be executed is selected, the processor performs control such that a number of copies to be printed is displayed in the slide button after the task is selected in an execution screen for the printing function, and wherein the processor performs control such that the number of copies to be printed is changeable by operating the slide button in which the number of copies to be printed is displayed.

2. The information processing apparatus according to claim 1, wherein the slide button is controlled so as to be displayed after the task is selected by an operation of the selection list.

3. The information processing apparatus according to claim 1, wherein the slide button is controlled so as to be displayed in a same row as that in which the selected task is displayed.

4. The information processing apparatus according to claim 1, wherein, in a case in which a preset specific task is selected from the tasks, a tap button is displayed instead of the slide button.

5. The information processing apparatus according to claim 1;

wherein, in a case in which a task for which a facsimile function is to be executed is selected, the processor performs control such that a number of copies to be transmitted is displayed in the slide button after the task is selected in an execution screen for the facsimile function, and a transmission destination list is displayed in the execution screen.

6. A non-transitory recording medium storing a control program executable by a computer to function as a control device that controls an information processing apparatus that executes a plurality of functions, wherein:

a selection list of tasks for selecting a task to be executed by the information processing apparatus and a slide button as an execution button for instructing execution of the selected task are simultaneously displayable in an operation screen, once an operation of instructing execution of the task by the slide button is detected, control is performed to change the slide button to a cancel button for canceling the task that is being executed, in a case in which a task for which a printing function is to be executed is selected, control is performed such that a number of copies to be printed is displayed in the slide button after the task is selected in an execution screen for the printing function, and control is performed such that the number of copies to be printed is changeable by operating the slide button in which the number of copies to be printed is displayed.

7. An information processing apparatus comprising:

a control device that comprises a processor and a memory coupled to or integrated with the processor and controls an information processing apparatus, wherein the processor is configured to:

simultaneously display, in an operation screen, a selection list of tasks for selecting a task to be executed by the information processing apparatus and a slide button as an execution button for instructing execution of the selected task, and a printer, wherein, in a case in which a task for which a printing function is to be executed is selected, the processor performs control such that a number of copies to be printed is displayed in the slide button, and wherein the processor performs control such that the number of copies to be printed is changeable by operating the slide button in which the number of copies to be printed is displayed.

* * * * *